(12) United States Patent
Matsuno et al.

(10) Patent No.: US 7,103,042 B2
(45) Date of Patent: Sep. 5, 2006

(54) NODE UNIT AND STATE NOTICE INFORMATION ACQUIRING METHOD

(75) Inventors: Kazuyoshi Matsuno, Sagamihara (JP); Kazuhiro Kobayashi, Hachioji (JP); Taro Shibagaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 952 days.

(21) Appl. No.: 10/101,772

(22) Filed: Mar. 21, 2002

(65) Prior Publication Data
US 2002/0136213 A1 Sep. 26, 2002

(30) Foreign Application Priority Data
Mar. 23, 2001 (JP) ............................. 2001-086274
Mar. 19, 2002 (JP) ............................. 2002-076100

(51) Int. Cl.
*H04L 12/28* (2006.01)

(52) U.S. Cl. ....................... 370/389; 370/503

(58) Field of Classification Search .................... None
See application file for complete search history.

(56) References Cited

U.S. PATENT DOCUMENTS 5,260,933 A * 11/1993 Rouse ...................... 370/216
5,920,563 A * 7/1999 Fukui et al. .............. 370/395.5
6,275,472 B1 * 8/2001 Yamaguchi et al. ......... 370/252
6,522,665 B1 * 2/2003 Suzuki et al. ............... 370/471
6,907,006 B1 * 6/2005 Sakamoto et al. ......... 370/236.2

FOREIGN PATENT DOCUMENTS

EP 1083691 A1 3/2001
JP 60-66535 4/1985

OTHER PUBLICATIONS

European Search Report mailed on Jan, 19, 2006, from European Patent Office in European Patent Application No. 02252075.3-2415.
US 5,699,349, 12/1997, Russ et al. (withdrawn)

* cited by examiner

*Primary Examiner*—Hassan Kizou
*Assistant Examiner*—Anthony Sol
(74) *Attorney, Agent, or Firm*—Finnegan, Henderson, Farabow, Garrett & Dunner, L.L.P.

(57) ABSTRACT

If the number of frame synchronization protecting stages for the transmission signal is m (m is a natural number) and the number of protecting stages for the state notice information is n (n is a natural number), when the expression $n \leq m < n \times 2$ holds, the contents shown in the state notice information corresponding to a k-th stage (where k is a natural number fulfilling the expressing $m < k \leq n \times 2$) frame using time X as a reference are regarded as valid among the contents shown in the state notice information protected over n stages using time X as a reference. Here, time X is the time when Out of Frame occurred.

4 Claims, 18 Drawing Sheets

NODE UNIT AND STATE NOTICE INFORMATION ACQUIRING METHOD

CROSS-REFERENCE TO RELATED APPLICATIONS

This application is based upon and claims the benefit of priority from the prior Japanese Patent Applications No. 2001-086274, filed Mar. 23, 2001; and No. 2002-076100, filed Mar. 19, 2002, the entire contents of both of which are incorporated herein by reference.

BACKGROUND OF THE INVENTION

1. Field of the Invention

This invention relates to a node unit used in a digital signal transmission system that transmits a transmission signal with a frame structure and to a state notice information acquiring method used in the node unit. More particularly, this invention relates to an improvement in a method of determining whether to carry out a control function on the basis of the state notice information by determining whether the state notice information transmitted in synchronization with the transmission signal is valid or invalid.

2. Description of the Related Art

In a digital signal transmission system with a plurality of node units, there are provided various protective functions for the purpose of preventing unnecessary responses to bit errors occurring sporadically and thereby stabilizing the operation of the system. One example of the protective functions is the number of frame protecting stages for protecting the frame synchronization of the transmission signal. Some system operation information transmitted in synchronization with the transmission signal has the number of protecting stages set in it. In the explanation below, state notice information used in the autonomous operation of a node unit will be taken as an example of system operation information.

The protecting operation in a conventional system will be explained by reference to FIG. 1. When a failure, such as the cutoff of the signal, occurs at time X, a signal with a specific bit pattern (assumed to be fixed pattern (A)) is transmitted as an alarm from a unit on the upstream side. The signal uses alternating data, such as 010101 . . . , and, in many cases, has no frame structure. Although a node which have received this signal might lose track of the end position of the transmission signal frame because the signal does not have a frame structure, the node attempts to hold on until the protecting period of five stages of frames has elapsed. Then, when the alarm still lasts after the frame protecting period has elapsed, the node senses Out of Frame, or the collapse of the frame synchronization.

On the other hand, for example, the protecting period for three stages of frames is set in the state notice information received at the node. That is, after the signal has been disconnected, the state notice information during the normal operation is held for up to three frames. When a change in the state notice information is sensed after the three frames have passed, an interrupt signal for taking in the state notice information is generated, and the contents of the register which holds the state notice information are taken in immediately. Then, according to the taken-in contents, an autonomous control operation is started at the node.

After the signal has been disconnected, the bit pattern of the state notice information is replaced with the bit pattern of the alarm. Thus, as shown in FIG. 1, the bit string of fixed pattern (A) has been written in the state notice information at the time when the interrupt occurred. More precisely, the bit string obtained by descrambling the bit string 010101 . . . of fixed pattern (A) has been written in the state notice information.

In a conventional system, when an interrupt has occurred, the state notice information is taken in immediately. As a result, the bit string based on the alarm might be mistaken for the normal state notice information, which might therefore permit an erroneous control operation to be performed.

As described above, in the conventional digital signal transmission system, when a node has sensed a change point in the state notice information protected for an n number of stages, this state notice information is taken in immediately and control according to the contents of the information is started. When m-stage protection is applied to the transmission signal and the function of notifying a downstream-side unit of the presence or absence of a failure on the upstream side by replacing the bit pattern of the transmission signal is provided, the replaced bit pattern is taken in as state notice information, if the expression $n \leq m$ holds. That is, there is a possibility that the process based on the erroneously recognized state notice information will be carried out and therefore the node will operate erroneously.

BRIEF SUMMARY OF THE INVENTION

The object of the present invention is to provide a node unit and a state notice information acquiring method which eliminate the possibility of faulty operation attributable to the erroneous recognition of state notice information.

According to the present invention, there is provided a node unit provided in a digital signal transmission system which includes a plurality of node units for transmitting a digital transmission signal in frame form, each frame of the digital transmission signal including at least a frame header indicating the end of the signal frame, and the plurality of node units exchanging state notice information about autonomous operation with one another, the node unit comprising: state notice information protecting means for taking in the state notice information when the state notice information coincides with predetermined n (n is a natural number) stages of frames consecutively; frame synchronization protecting means for protecting the frame synchronization of the digital transmission signal until errors are sensed consecutively over predetermined m (m is a natural number) stages of frames in the frame header; and information taking-in means for, if the expression $m \geq n$ holds when the frame synchronization protecting means has sensed errors consecutively over m stages of frames in the frame header, regarding the state notice information included in a k-th stage (where $m < k \leq 2n$) frame as valid information using the frame including the frame header where an error first occurred as a reference and taking in the valid information.

Errors in the frame header include not only bit errors but also a state where the signal disappears as a result of the disconnection of the signal cable or the like. In short, errors mean a state where the bit string of the previously defined frame header has been lost.

More generally, a node unit related to the present invention comprises information taking-in means for, if the expression $m > 2n$ holds when the frame synchronization protecting means has sensed errors consecutively over m stages of frames in the frame header, regarding the state notice information included in a k-th stage (provided that k meets the expression $m < k \leq (Int(m/n)+1) \times n$, where $Int(m/n)$ is an integer obtained by discarding decimals of m/n) frame as valid information using the frame including the frame header where an error first occurred as a reference and taking in the valid information.

Specifically, the information taking-in means defers the process of taking in the state notice information until the k-th stage frame is reached and regards the state notice information as valid unless the frame synchronization protecting means does not sense Out of Frame in the range from the n-th stage frame to the k-th stage frame.

Providing such means causes the contents of the state notice information to be taken in after two frames have passed since a change in the protected state notice information was sensed, in a system with, for example, m=5 and n=3. In the state notice information at that time, not the bit string based on fixed pattern (A) but a fixed signal with another bit pattern (assumed to be fixed pattern (B)) has been written. In this case, fixed pattern (A) is valid as state notice information, whereas fixed pattern (B) is invalid as state notice information.

Consequently, the process based on fixed pattern (A) is prevented from being carried out in the node. Specifically, it is possible to prevent the node from recognizing the bit string with fixed pattern (A) based on an alarm as normal state notice information. This eliminates the possibility of erroneous operation.

Furthermore, according to this invention, whether the contents of the protected state notice information are valid or not is determined according to the presence or absence of the occurrence of OOF without the possibility of mistakes. As a result, a faulty operation in, for example, the protection switching function can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, referring to the accompanying drawings, embodiments of the present invention will be explained. In the embodiments, information about an autonomous protection switching function is taken as an example of state notice information. The autonomous protection switching function is a function that most of the trunk systems have.

In a trunk system, a unit with a relay function and others (hereinafter, referred to as a transmission unit) may be caused to intervene between a line cable for transmitting a transmission signal and a node. The transmission unit has the function of, when a failure has occurred on the upstream side, notifying the downstream side of the occurrence of the failure. When sensing the occurrence of the failure, the transmission unit replaces the bit pattern of the transmission signal with fixed pattern (A), thereby notifying a node or the like on the downstream side of the occurrence of the failure. Fixed pattern (A) is characterized by having no frame structure.

If fixed pattern (A) has a meaning as state notice information, the node interprets the meaning given in pattern (A) and starts switching control according to the contents. This might cause faulty operation, such as abnormal determination or misconnection.

<Explanation of Operation Principle>

The above problem is solved on the basis of the operation principle explained below. In the explanation, it is assumed that the number n of protecting stages for state notice information is n=3 and the number m of synchronization protecting stages for transmission signal frames is m=5.

Figure 1:
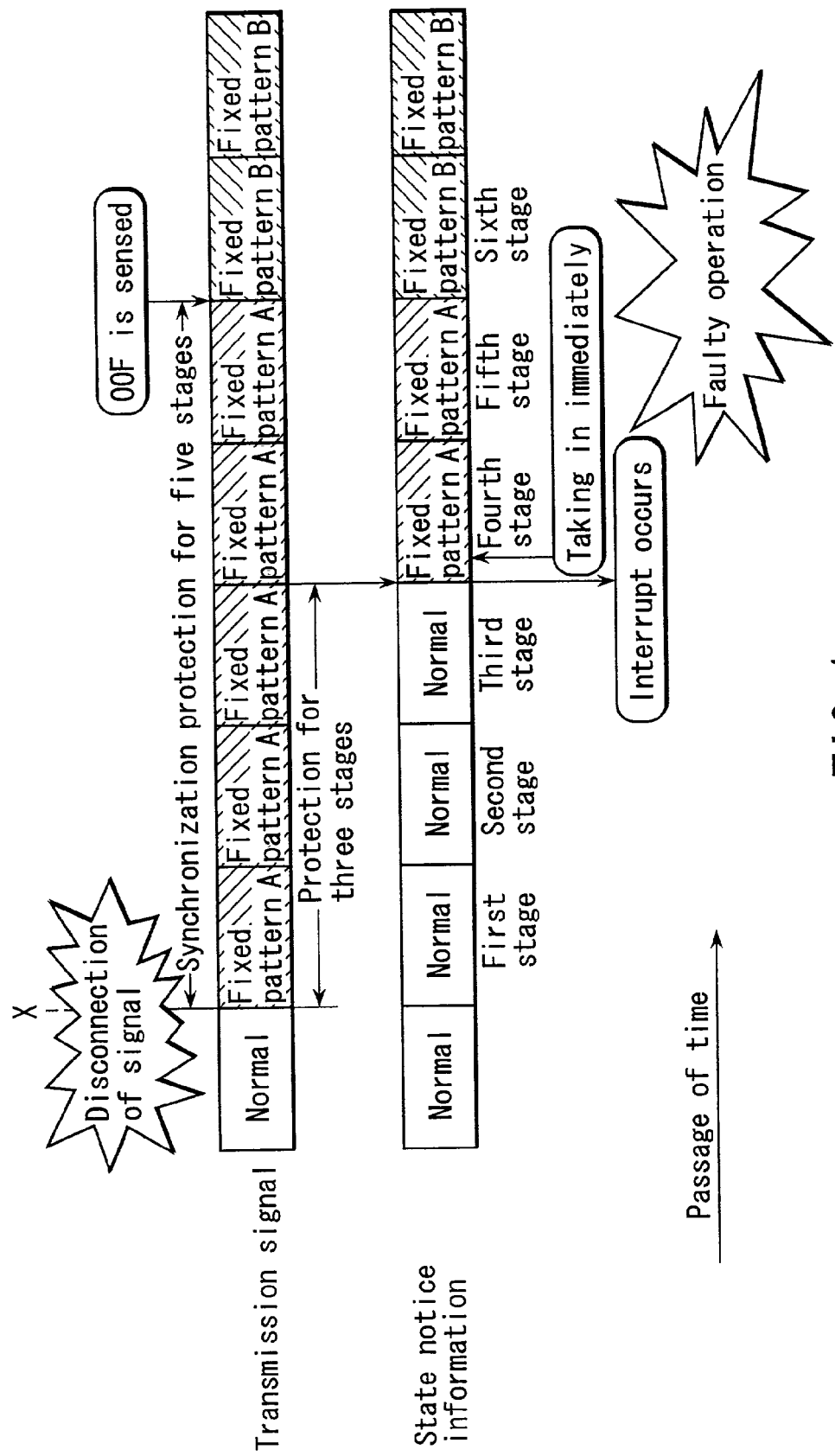
FIG. 1 is a time chart to help explain failure in a conventional ordinary digital signal transmission system.
Figure 2:
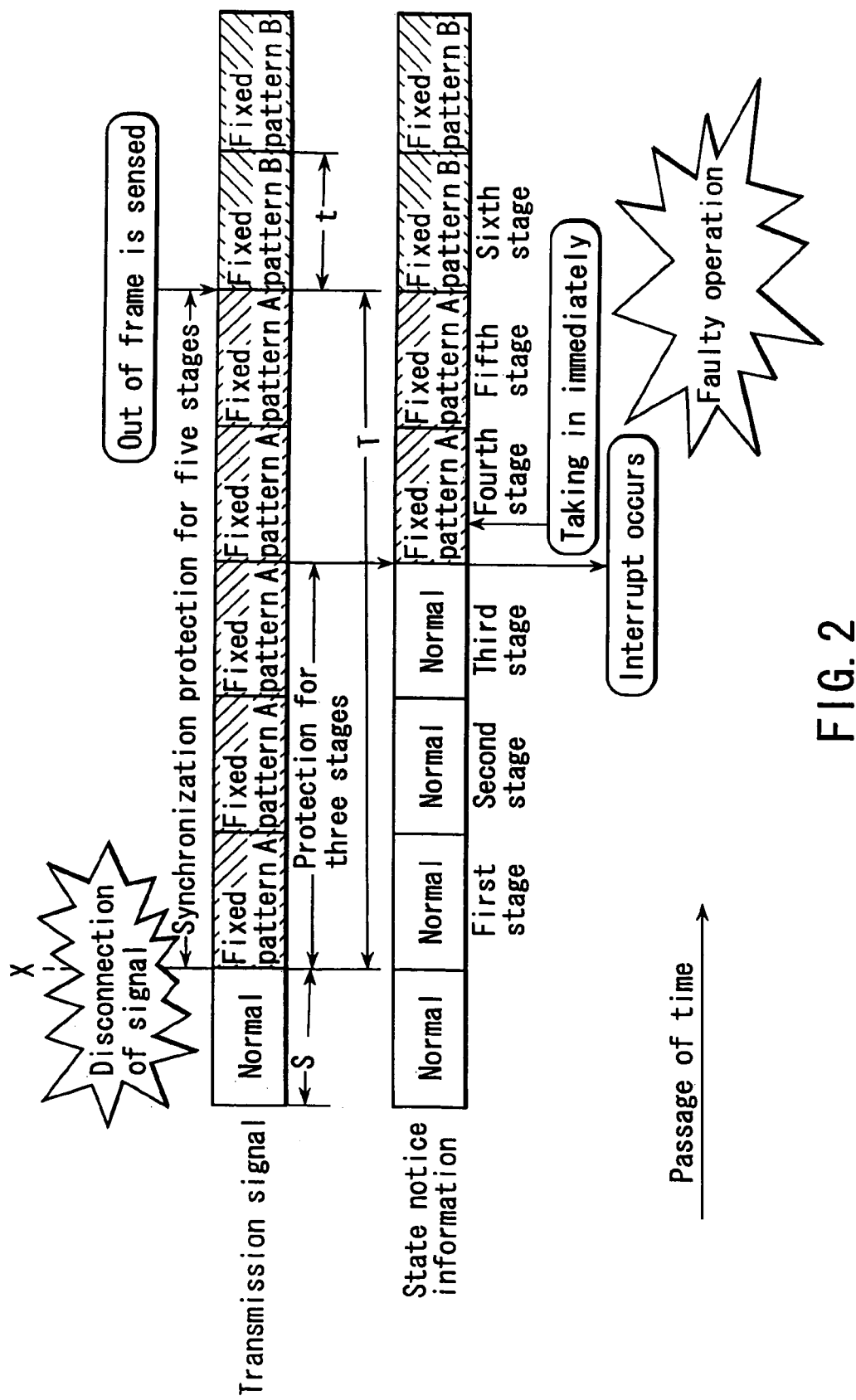
FIG. 2 is a time chart to help explain the operation principle related to the present invention.

The operation principle of the present invention will be explained by reference to FIG. 2. In FIG. 2, the letter S corresponds to the frame period of the transmission signal and the letter T corresponds to the frame synchronization protecting period from time X when Out of Frame takes place in the transmission signal.

In FIG. 2, the letter t corresponds to a sixth stage frame using as a reference the frame including the frame header in which an error first occurred. That is, the letter t corresponds to k when $m<k \leq 2n$. The node in the embodiment takes in the contents of the state notice information in the period t.

Furthermore, when Out of Frame has been sensed, an invalid fixed pattern (B) is inserted as state notice information. In FIG. 2, fixed pattern (B) is inserted in the sixth stage frame and later. By doing this, the node is prevented from operating erroneously.

Figure 3:
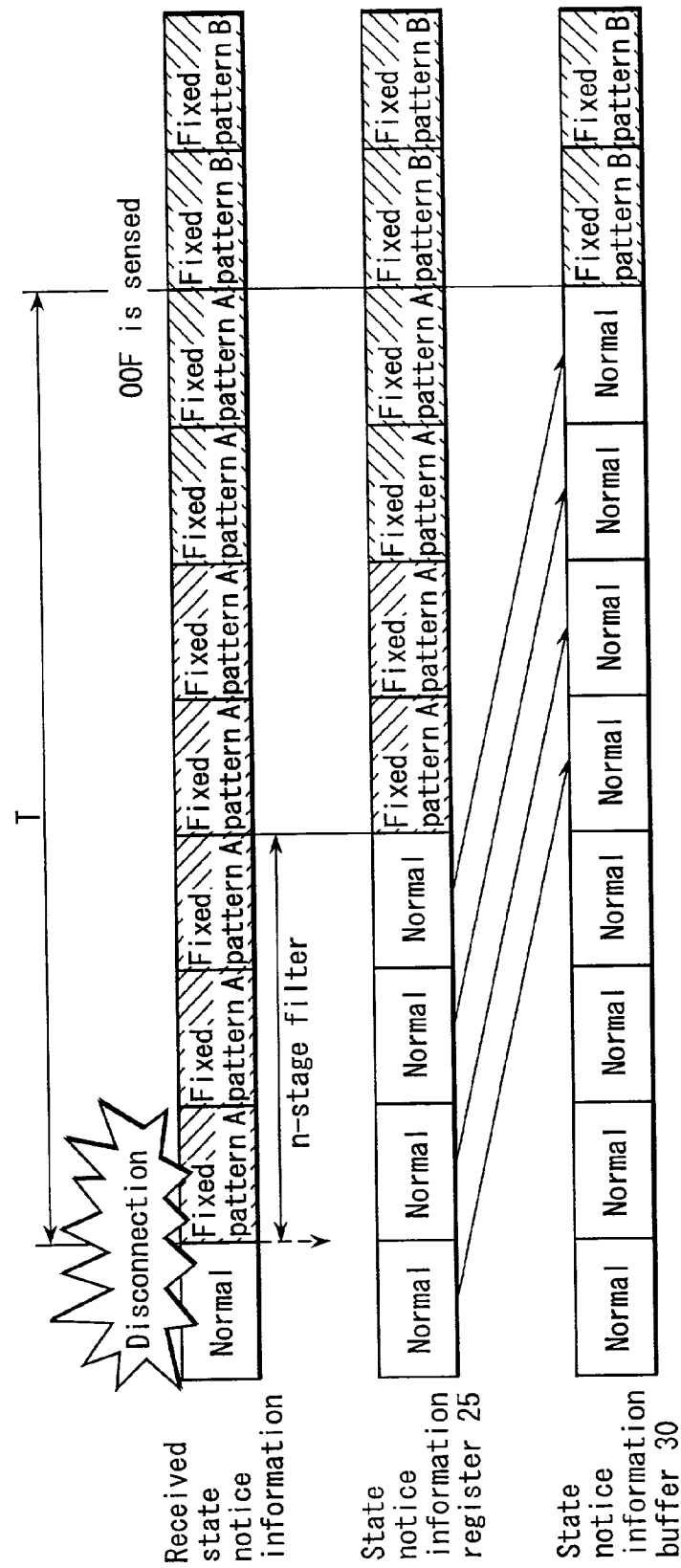
FIG. 3 is a time chart to help explain a more generalized operation principle.

A more generalized operation principle will be explained by reference to FIG. 3. In FIG. 3, a case with m=7 and n=3 is assumed. When the received state notice information coincides over three stages of frames, it is loaded into a state notice information register 25 (explained later). A reception state information buffer 30 (explained later), which is realized by, for example, a shift register, stores four frames of state notice information.

In the normal state of the system, the contents of the state notice information are recognized on the basis of the information stored in the state notice information buffer 30. According to the contents, the necessary process is executed. On the other hand, when Out of Frame (OOF) is sensed, the received state notice information and all the contents of the state notice information register 25 and state notice information buffer 30 are considered to be state notice information at that time and an invalid fixed pattern (B) is inserted. Taking in the fixed pattern (B) enables faulty operation to be prevented.

The embodiment discloses a node unit which realizes most of the process based on the above operation principle by using hardware. If the capability of the processor is sufficient, the idea of the present invention may be realized by software. In this case, the process based on the flowchart shown in FIG. 4 is executed by the computer.

Figure 4:
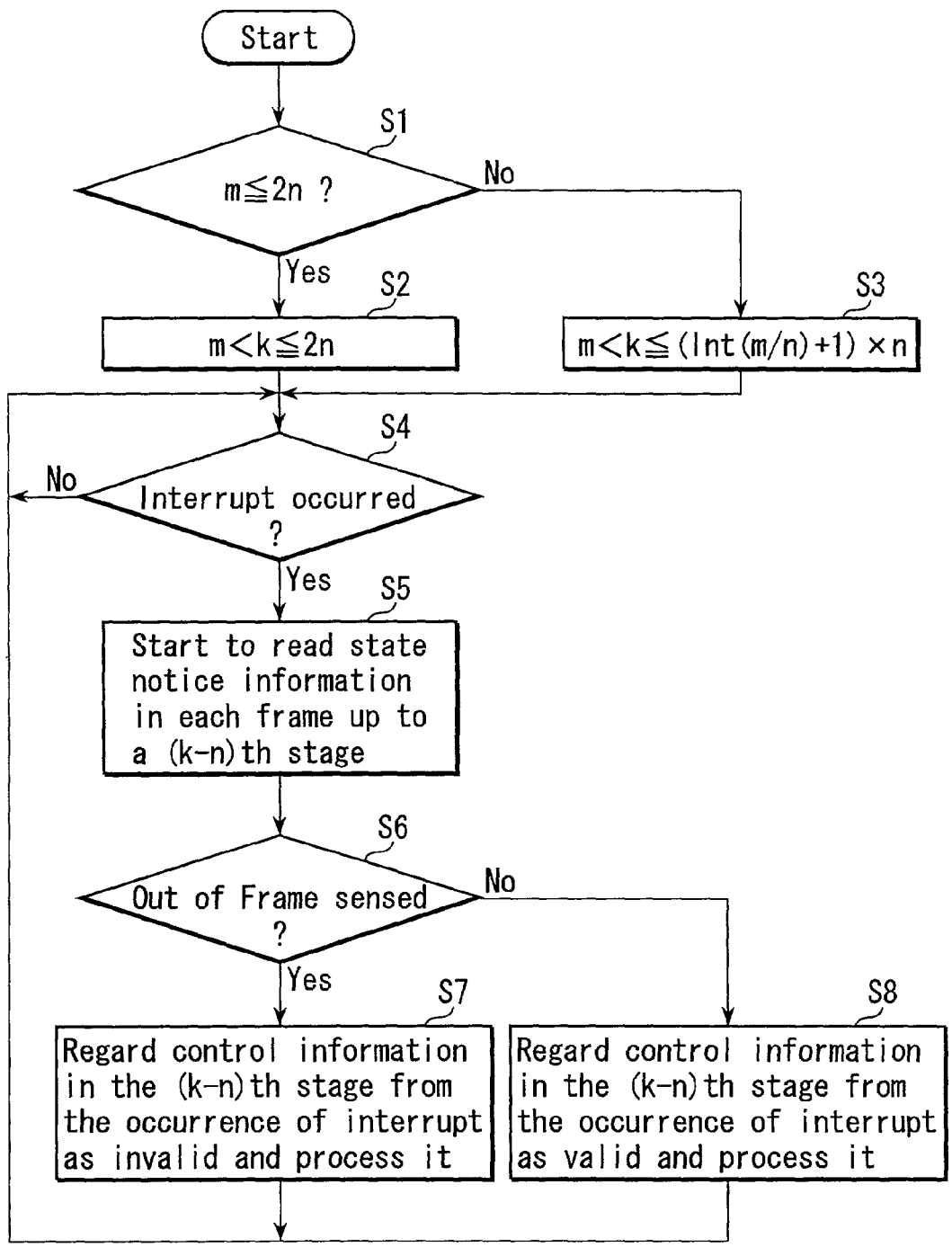
FIG. 4 is a time chart to help explain the operation principle related to the present invention.

FIG. 4 is a flowchart to help explain the principle of the present invention. In FIG. 4, the relationship between the setting values of m and n is verified in step S1. If YES in this step, the procedure proceeds to step S2, where k is set as shown in the figure. In contrast, if NO in step S1, the procedure goes to step S3, where k is set as shown in the expression.

Thereafter, the procedure goes to step S4. In step S4, if an interrupt for taking in state notice information occurs, the procedure goes to step S5, where the reading of state notice information about each frame is started. In step S6, it is determined whether Out of Frame has been sensed. If Out of Frame has not been sensed during the time from when the interrupt occurred until a (k−n)-th stage frame has been read (NO in step S6), the procedure goes to step S8, where the state notice information during the time from when the interrupt occurred until the (k−n)-th state frame has been read is considered to be valid and is processed. On the other hand, if Out of Frame has been sensed (YES in step S6), the procedure moves to step S7, where the state notice information during the time from when the interrupt occurred until the (k−n)-th stage frame has been read is considered to be invalid and is discarded.

<Basic Configuration>

The basic configuration of the system shown in the embodiment will be explained.

Figure 5:
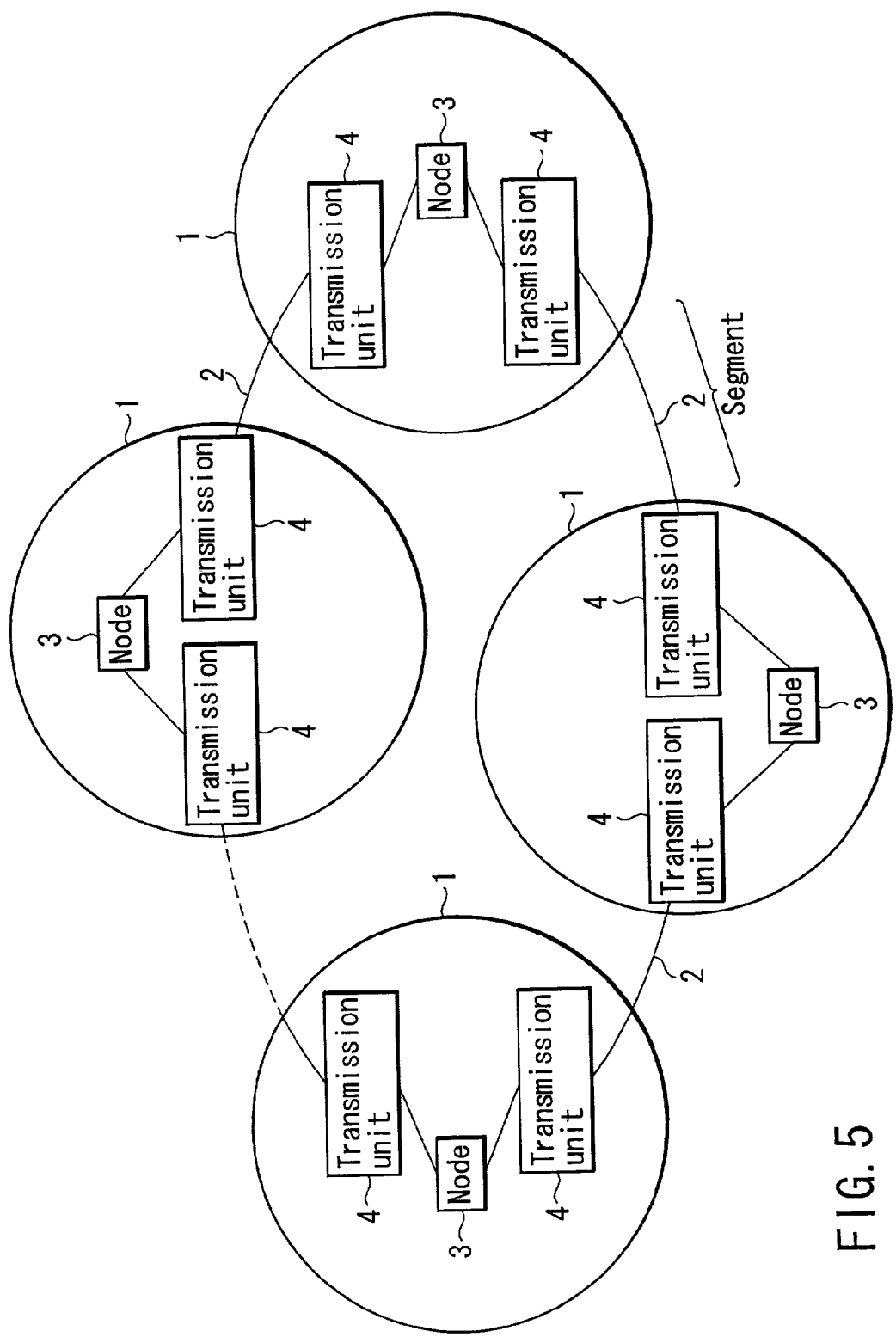
FIG. 5 is a system diagram showing the configuration of a digital signal transmission system according to an embodiment of the present invention.

FIG. 5 is a system diagram showing the configuration of a digital signal transmission system related to the embodiment. The system of FIG. 5 is such that a plurality of stations 1 are connected in a ring via a line cable 2. Each station 1 includes a node 3 and transmission units 4. The node 3 is connected to the line cable 2 via the transmission units 4. The section sandwiched between station 1 and station 1 is called a segment.

Figure 6:
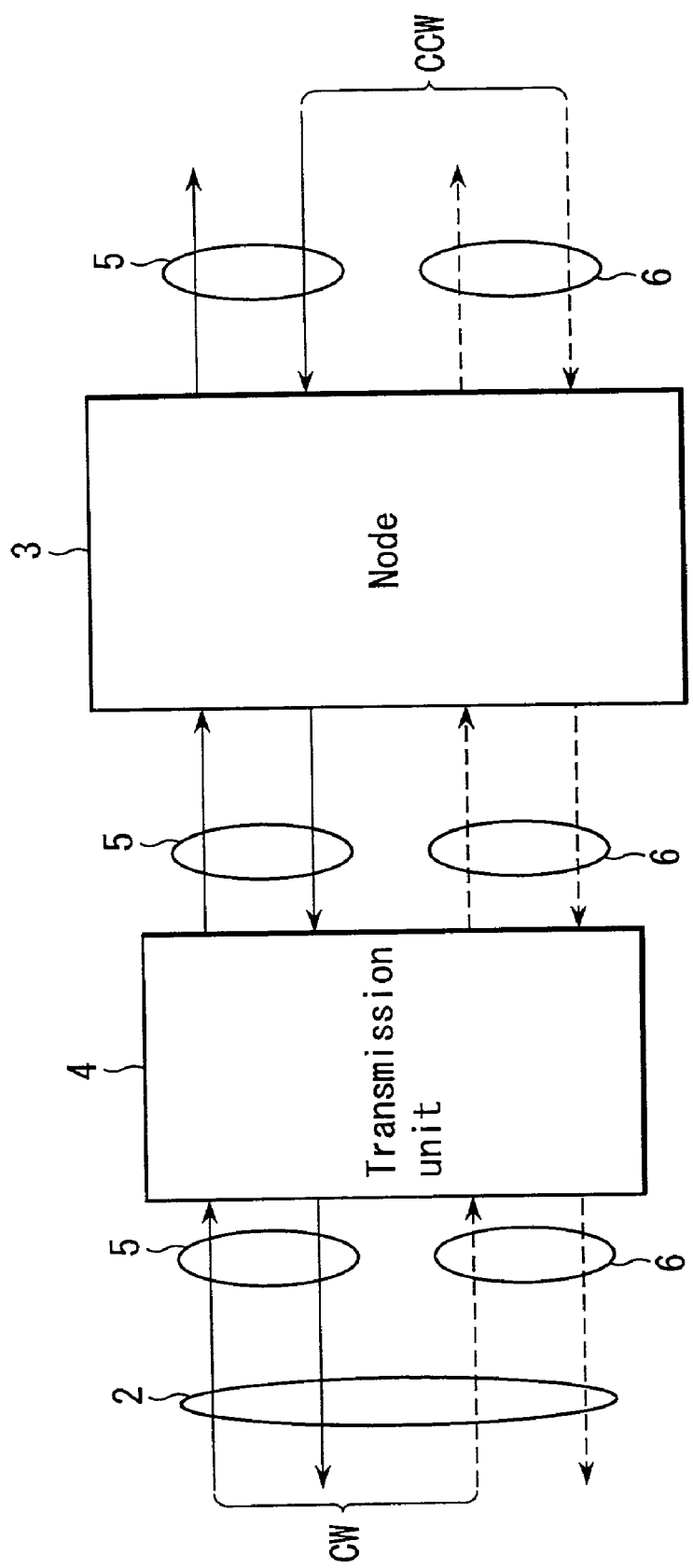
FIG. 6 is a diagram to help explain the configuration of line cable 2.

As shown in FIG. 6, the line cable 2 is composed of a service line 5 and a protection line 6. When there is no failure in the system, that is, when the system is in the normal state, service traffic is transmitted via the service line 5. At this time, since the protection line 6 is vacant, a low-priority signal called part-time traffic may be allowed to flow through the protection line 6. Each of the service traffic and part-time traffic has the same frame structure.

When a failure has occurred in the normal state, the part-time traffic is pre-empted from the protection line 6 and the service traffic is detoured to the protection line 6. This process is realized by the autonomous protection switching function each node 3 has, under the cooperative control of the individual nodes 3. This type of function is also called a self-healing function.

In FIG. 6, the service line 5 is composed of a pair of signal lines which transmit signals in opposite directions and the protection line 6 is composed of a pair of signal lines which transmit signals in opposite directions. In the ring-like system as shown in FIG. 5, one direction is called a clockwise (CW) direction and the other direction is called a counterclockwise (CCW) direction to distinguish between them. In FIG. 6, the direction toward the right is the CW direction and the direction toward the left is the CCW direction.

The concept of the upstream side and downstream side will be explained. In FIG. 6, as for the CW line, the transmission unit 4 is located on the upstream side with respect to the node 3. Conversely, the node 3 is located on the downstream side with respect to the transmission unit 4. On the other hand, as for the CCW line, the transmission unit 4 is located on the downstream side with respect to the node 3. Conversely, the node 3 is located on the upstream side with respect to the transmission unit 4.

Figure 7:
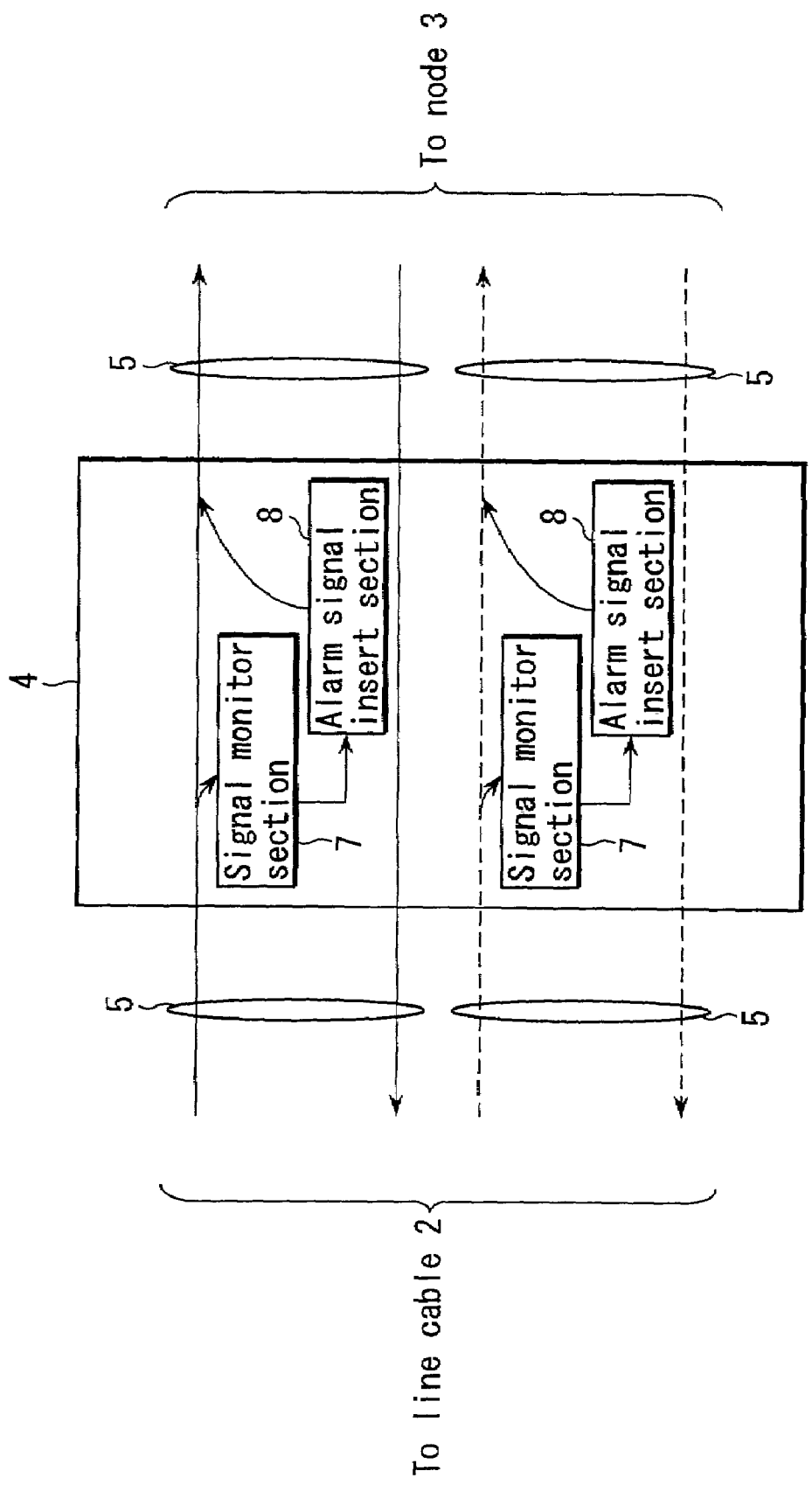
FIG. 7 is a block diagram schematically showing the configuration of the transmission unit 4 shown in FIG. 5.

FIG. 7 is a block diagram schematically showing the configuration of the transmission unit 4. In FIG. 7, the transmission unit 4 includes a signal monitor section 7 and an alarm signal insert section 8. The signal monitor section 7 and alarm signal insert section 8 are provided in each of the service line 5 and the protection line 6. The signal monitor section 7 monitors the state of the traffic transmitted from the upstream side and determines whether there is a failure or not. When sensing the occurrence of a failure, such as the disconnection of the cable, the signal monitor section 7 informs the alarm signal insert section 8 of the occurrence of the failure. When receiving the notice of the occurrence of the failure, the alarm signal insert section 8 inserts an arbitrary fixed pattern in the downstream side of the line in which the failure has been sensed. This pattern is subjected to processes, including scrambling. Then, the resulting pattern is transmitted as fixed pattern (A) to the node 3.

Figure 8:
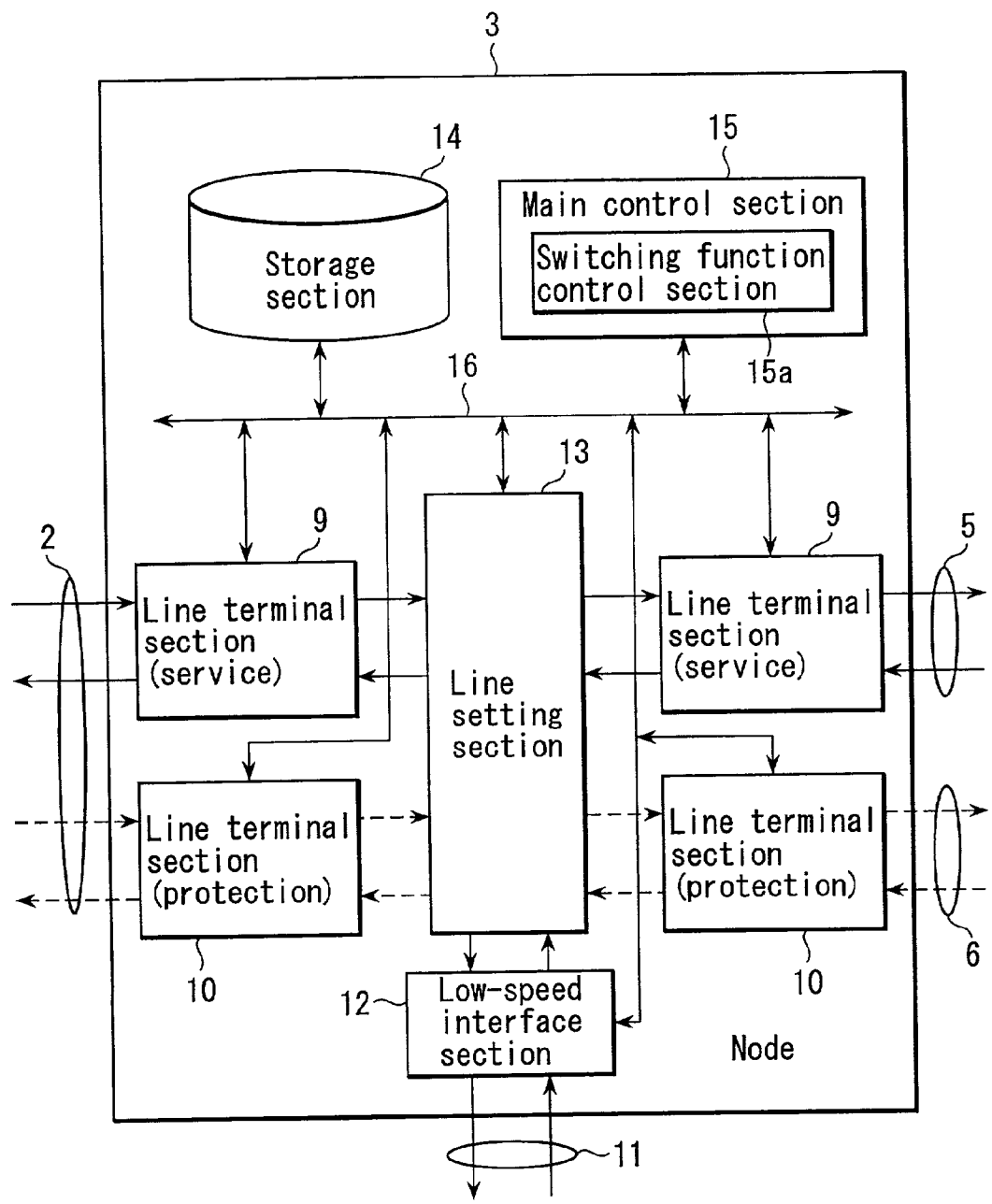
FIG. 8 is a block diagram showing the configuration of node 3 shown in FIG. 5.

FIG. 8 is a block diagram showing the configuration of the node 3. In FIG. 8, the node 3 includes a service line terminal section 9, a protection line terminal section 10, a low-speed interface section 12, a line setting section 13, a storage section 14, and a main control section 15. The service line terminal section 9 terminates the service line 5. The protection line terminal section 10 terminates the protection line 6. The low-speed interface section 12 terminates the low-speed line 11. The line setting section 13 exchanges the multiplex signal introduced into the unit via the line terminal sections 9 and 10 and low-speed interface 12. The main control section 15 includes a CPU (Central Processing Unit) (not shown).

The service line terminal section 9, protection line terminal section 10, low-speed interface section 12, line setting section 13, storage section 14, and main control section 15 are connected to one another via an external CPU bus 16. The low-speed line 11 is connected to low-order group units, including an exchange (not shown).

The node 3 causes the line setting section 13 to demultiplex the time slots time-division multiplexed with the high-order group signal transmitted via the line cable 2 and sends the resulting signals via the low-speed line 11 to a low-order group unit (not shown). The low-order group signal that has arrived through the low-speed line 11 from a low-order unit (not shown) is multiplexed with an arbitrary slot in the high-order signal at the line setting circuit 13. The resulting signal is transmitted via the line cable 2 to an adjacent node.

The main control section 15 includes switching function control section 15a. The switching function control section 15a executes the process of realizing the autonomous protection switching function according to a known procedure written in, for example, ITU-T recommendation G. 841. The function of the switching function control section 15a is realized by software control based on the control program stored in, for example, the storage section 14.

Figure 9:
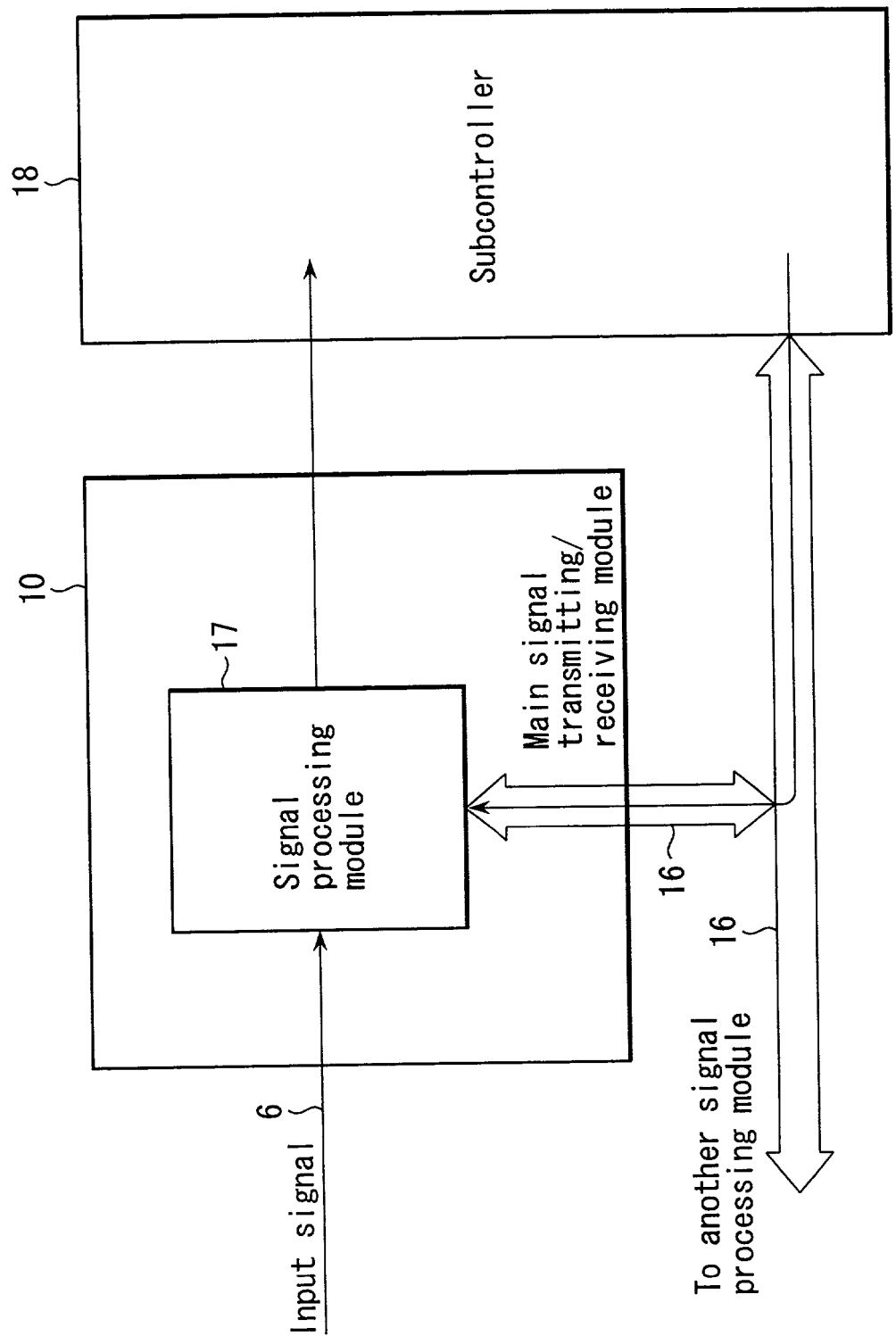
FIG. 9 is a block diagram showing the configuration of the protection line terminal section 10 shown in FIG. 8.

FIG. 9 is a block diagram schematically showing the configuration of the protection line terminal section 10. The protection line terminal section 10 includes a signal processing module 17 and a subcontroller 18. The signal processing module 17, which terminates the multiplex signal introduced into the present node via the protection line 6, carries out various signal processes. The subcontroller 18 performs supervisory control in the protection line terminal section 10 on the basis of the various signals supplied from the signal processing module 17. The signal processing module 17 and the subcontroller 18 are connected via an external CPU bus 16.

FIRST EMBODIMENT

Hereinafter, a first embodiment of the present invention will be explained. In the first embodiment, it is assumed that the number n of protecting stages for state notice information is n=3 and the number m of synchronization protecting stages for transmission signal frames is m=5. Under this assumption, the following expression holds: $n \leq m < n \times 2$.

Figure 10:
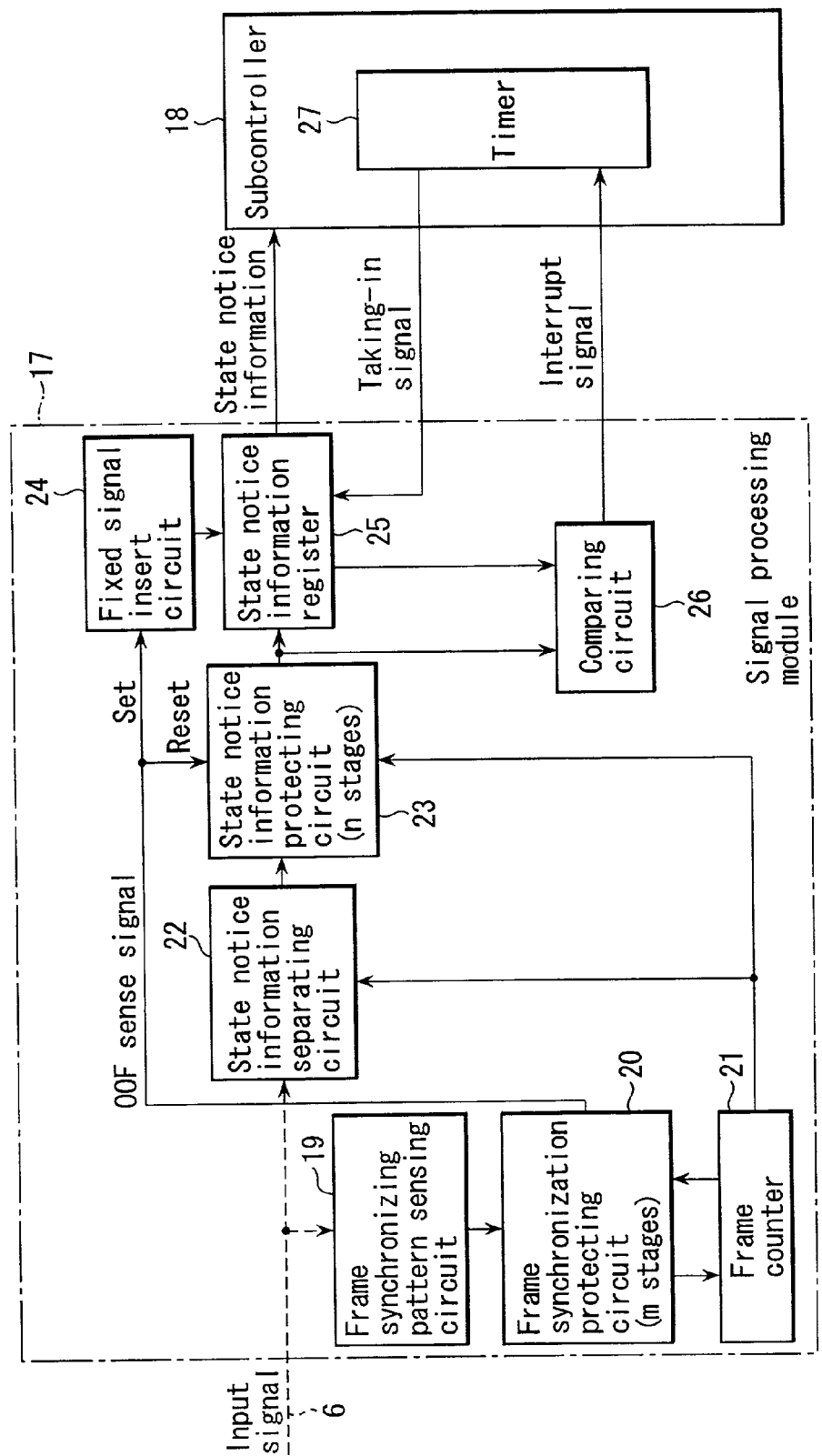
FIG. 10 is a block diagram showing the configuration of the signal processing module 17 and subcontroller 18 of FIG. 9 in a first embodiment of the present invention.

FIG. 10 is a block diagram showing the configuration of the signal processing module 17 and subcontroller 18 of FIG. 9 in the first embodiment. In FIG. 10, the signal processing module 17 includes a frame synchronizing pattern sensing circuit 19, a frame synchronization protecting circuit 20, a frame counter 21, a state notice information separating circuit 22, a state notice information protecting circuit 23, a fixed signal insert circuit 24, a state notice information register 25, and a comparing circuit 26. The subcontroller 18 includes a timer 27.

The frame synchronizing pattern sensing circuit 19 senses the frame synchronizing pattern of the multiplex signal. That is, the frame synchronizing pattern sensing circuit 19 senses a specific bit pattern defined in the overhead of the multiplex signal. The frame synchronization protecting circuit 20 monitors the end position of the bit pattern and protects the frame synchronization of the multiplex signal over m stages (m is a natural number). When the Out of Frame has been sensed, an OOF sense signal is output. The frame counter 21 counts the frames of the multiplex signal.

The state notice information separating circuit 22 separates and extracts state notice information about the autonomous protection switching function from the multiplex signal. State notice information is one piece of the control information defined in the overhead of the multiplex signal. The state notice information is used for enabling the control information to be exchanged between the transmission terminal units, including node units, to effect protection switching. In addition, the state notice information is also used for informing another node unit of the alarm state.

The state notice information protecting circuit 23 protects n stages (n=3) of the state notice information extracted at the state notice information separating circuit 22. When an OOF sense signal has been produced, the state notice information protecting circuit 23 resets the protection of the state notice information.

The state notice information register 25 holds the protective output of the state notice information from the state notice information protecting circuit 23. When receiving the OOF signal from the frame synchronization protecting circuit 20, the fixed signal insert circuit 24 causes the state notice information register 25 to hold a fixed signal with a specific bit string (assumed to be a fixed pattern (B)).

The comparing circuit 26 senses a change point in the protective output of the state notice information from the state notice information protecting circuit 23. That is, the comparing circuit 26 compares the protective output of the state notice information from the state notice information protecting circuit 23 with the contents held in the state notice information register 25. If they differ from each other, the comparing circuit 26 determines that the state notice information has changed and generates an interrupt signal. It supplies the interrupt signal to the subcontroller 18.

When receiving the interrupt signal, the subcontroller 18 supplies a taking-in signal to the state notice information register 25 and takes in the contents held in the state notice information register 25. Then, the subcontroller 18 supplies the contents to the switching function control section 15a.

In the first embodiment, the subcontroller 18 includes the timer 27. When receiving the interrupt signal from the comparing circuit 26, the timer 27 starts. After counting the time equivalent to (m−n) frames, the timer 27 generates a taking-in signal.

Figure 11:
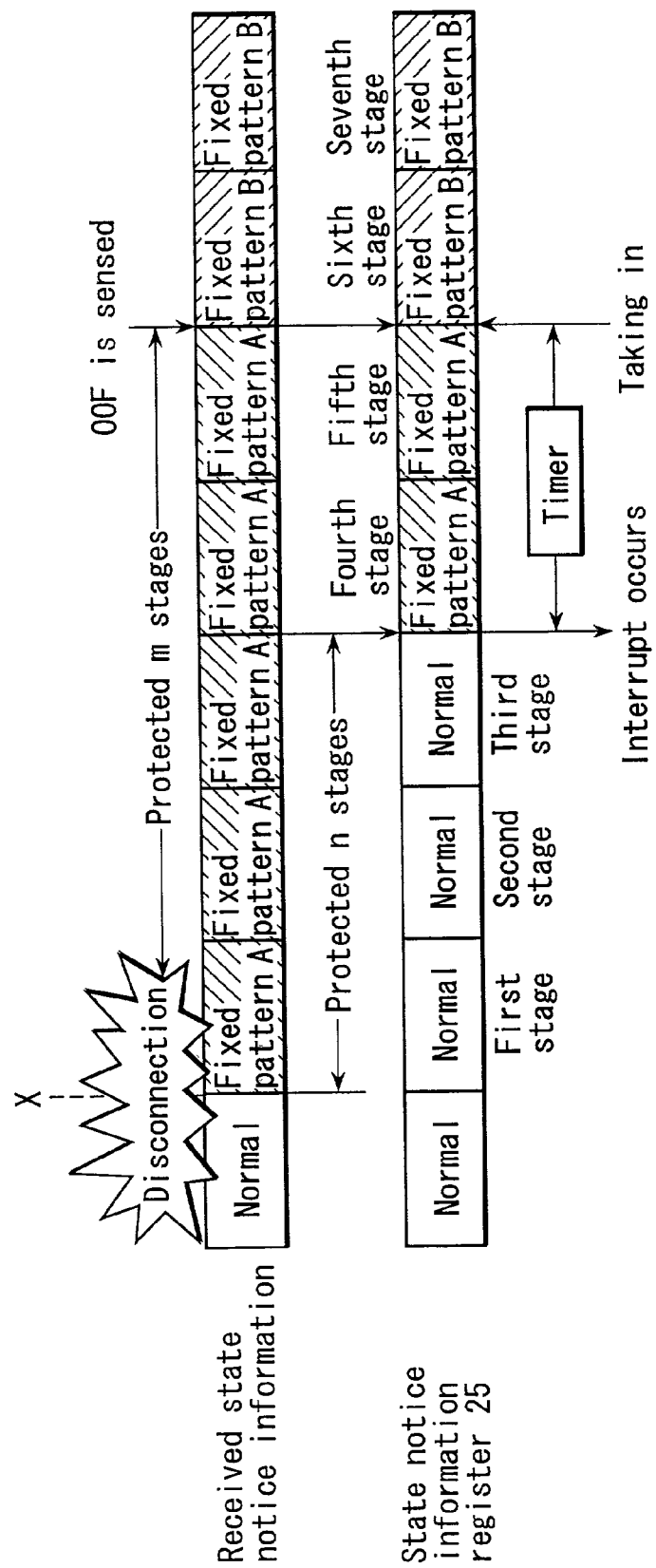
FIG. 11 is a time chart to help explain the operation in the configuration of FIG. 10.

The operation of the above configuration will be explained by reference to FIG. 11. In FIG. 11, when a signal disconnection failure has occurred at time X, the possibility of Out of Frame arises from this time on. Then, after five stages of protection, Out of Frame is sensed. Moreover, after three stages of protection from time X, the state notice information held in the state notice information register 25 changes, with the result that an interrupt signal is generated.

Then, this interrupt signal is delayed for two frames by the function of the timer 27. Therefore, in the sixth stage frame, the contents of the state notice information register 25 are taken in. The taken-in information is supplied to the switching function control section 15a via the external CPU bus 16.

At this time, if contents having no meaning as state notice information (for example, FF in hexadecimal form) have been written in fixed pattern (B), the switching function control section 15a regards the contents as invalid. That is, the switching function control section 15a considers the read register value to be invalid state notice information and discards it. Then, it dose not carry out the process according to the contents of fixed pattern (B). As a result, a faulty operation in, for example, the protection switching function can be prevented.

Furthermore, in the node 3 in the first embodiment, whether the contents of the protected state notice information are valid or not is determined according to the presence or absence of the occurrence of OOF without the possibility of a mistake. Thus, the protection switching function can be prevented from operating erroneously.

As described above, in the node 3 of the first embodiment, the signal processing module 17 includes the state notice information protecting circuit 23 which protects n (n=3) frames of the state notice information separated and extracted from the input multiplex signal, the state notice information register 25 which holds the protected state notice information, the comparing circuit 26 which outputs an interrupt signal when the protected output from the state notice information protecting circuit 23 differs from the contents held in the state notice information register 25, the frame synchronization protecting circuit 20 which protects m (m=5) frames of the multiplex signal, the fixed signal insert circuit 24 which causes the state notice information register 25 to hold an invalid fixed signal as state notice information when the frame synchronization protecting circuit 20 has sensed OOF. The subcontroller 18, which takes in the contents held in the state notice information register 25 in the presence of the interrupt signal output from the comparing circuit 26, includes the timer 27 which delays the interrupt signal. Then, after a delay time equivalent to two frame or more and three frame or less since the occurrence of the interrupt signal, the subcontroller 18 takes in the state notice information held in the state notice information register 25.

Since the delay time in the timer 27 is set to two frames or more and three frames or less, when Out of Frame takes place, the bit string of fixed pattern (A) is not taken in and fixed pattern (B) due to OOF is taken in. Thus, the subcontroller 18 can carry out the process according to OOF. In the normal state, the value of the state notice information register is protected over three frames, so that the proper value of the state notice information can be taken in without any omission. As a result, it is possible to eliminate the possibility of a faulty operation attributable to the erroneous recognition of the state notice information.

For example, when the delay time in the timer 27 is set longer than three frames, the value of a seventh stage of the register in FIG. 11 is taken in. In this case, when no OOF has taken place, there is a possibility that the state notice information present in the range from a fourth stage to a sixth stage will be omitted. In the first embodiment, such trouble can be prevented.

Furthermore, in the above configuration, the state notice information register 25 has only to buffer just three frames. That is, the buffering of five frames for protection is not needed, which leads to a decrease in the hardware size.

In addition, the subcontroller 18 and main control section 15 need not perform the following control: determining whether the state notice information after the buffering of five frames is the fixed value of OOF, determining whether the state notice information is the normal value or the bit string of fixed pattern (B) due to OOF, and according to the result, switching between the subsequent processes. As a result, the software response process can be made faster.

Moreover, in the first embodiment, within one frame from the time when Out of Frame is sensed, the contents held in the state notice information register are taken in. Setting this timing enables all the state notice information to be sensed without any omission, even when the state notice information changes continually every three frames. As a result, when the system is not in the Out-of-Frame state and therefore is in the normal state, control can be performed without any trouble.

That is, when Out of Frame has taken place, the bit string of fixed pattern (B) is read instead of the bit string of fixed pattern (A). This enables control to be performed on the basis of OOF. Since the contents held in the state notice information register are protected over three frames in the normal state, the normal value of the state notice information can be read at all times.

In the first embodiment, the timer 27 may be realized in hardware by using a timer circuit with an oscillation element. Alternatively, it may be a software timer. Use of a hardware timer enables the burden of software processing on the subcontroller 18 to be reduced. Of course, when the processor has sufficient capability, there is no problem in using a software timer.

SECOND EMBODIMENT

Figure 12:
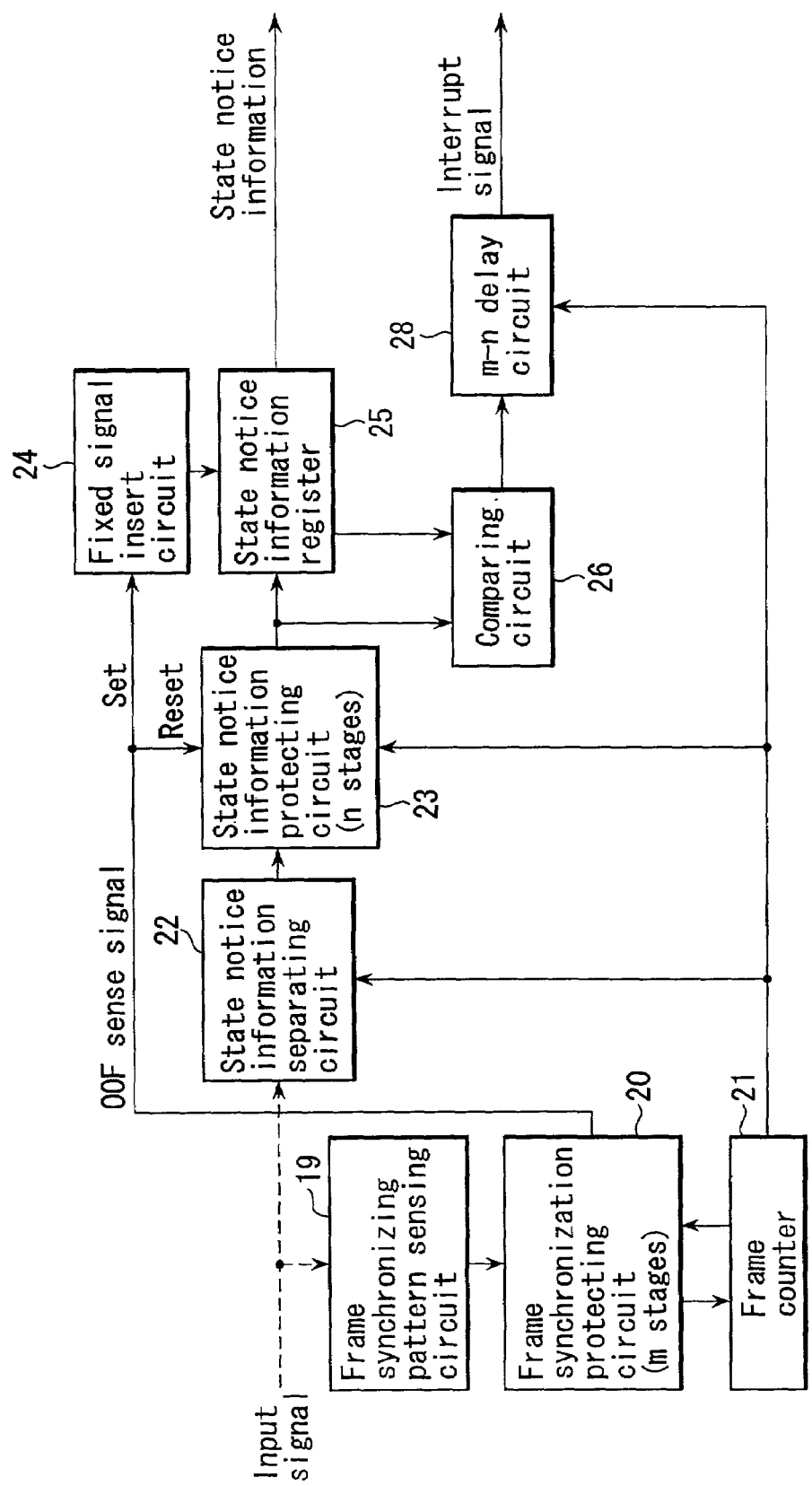
FIG. 12 is a block diagram of the signal processing module 17 of FIG. 9 in a second embodiment of the present invention.

Next, a second embodiment of the present invention will be explained. FIG. 12 is a block diagram of the signal processing module 17 of FIG. 9 in the second embodiment. In FIG. 12, the parts common to those in FIG. 10 are indicated by the same reference numerals and only the different parts will be explained. In the second embodiment, the subcontroller 18 need not include the timer 27.

In FIG. 12, the signal processing module 17 includes a (m−n) delay circuit 28 which delays the interrupt signal generated at the comparing circuit 26 for (m−n) frames and supplies the delayed signal to the subcontroller 18. Since m=5 and n=3 here, the (m−n) delay circuit 28 delays the signal for two frames.

Figure 13:
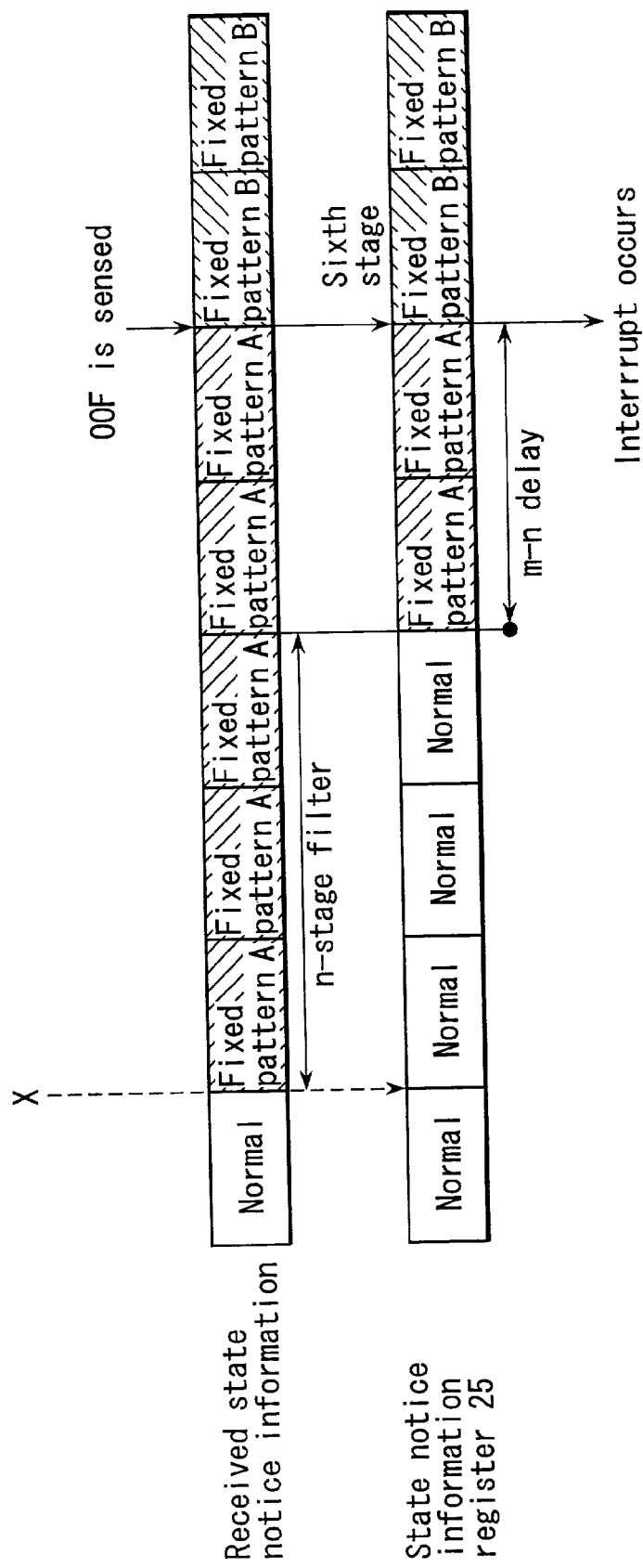
FIG. 13 is a time chart to help explain the operation in the configuration shown in FIG. 12.

The operation in the above configuration will be explained by reference to FIG. 13. In FIG. 13, after three stages of protection from time X, the state notice information changes. Normally, an interrupt signal would be generated at this time. In the second embodiment, however, the (m−n) delay circuit 28 delays the interrupt signal for two frames and supplies the delayed signal to the subcontroller 18.

As a result, the value in the sixth stage of the register is read. With this reading, the timing of taking in the contents (register value) held in the state notice information register 25 can be made similar to that in the first embodiment. Consequently, the second embodiment also produces the same effect as that of the first embodiment.

THIRD EMBODIMENT

Figure 14:
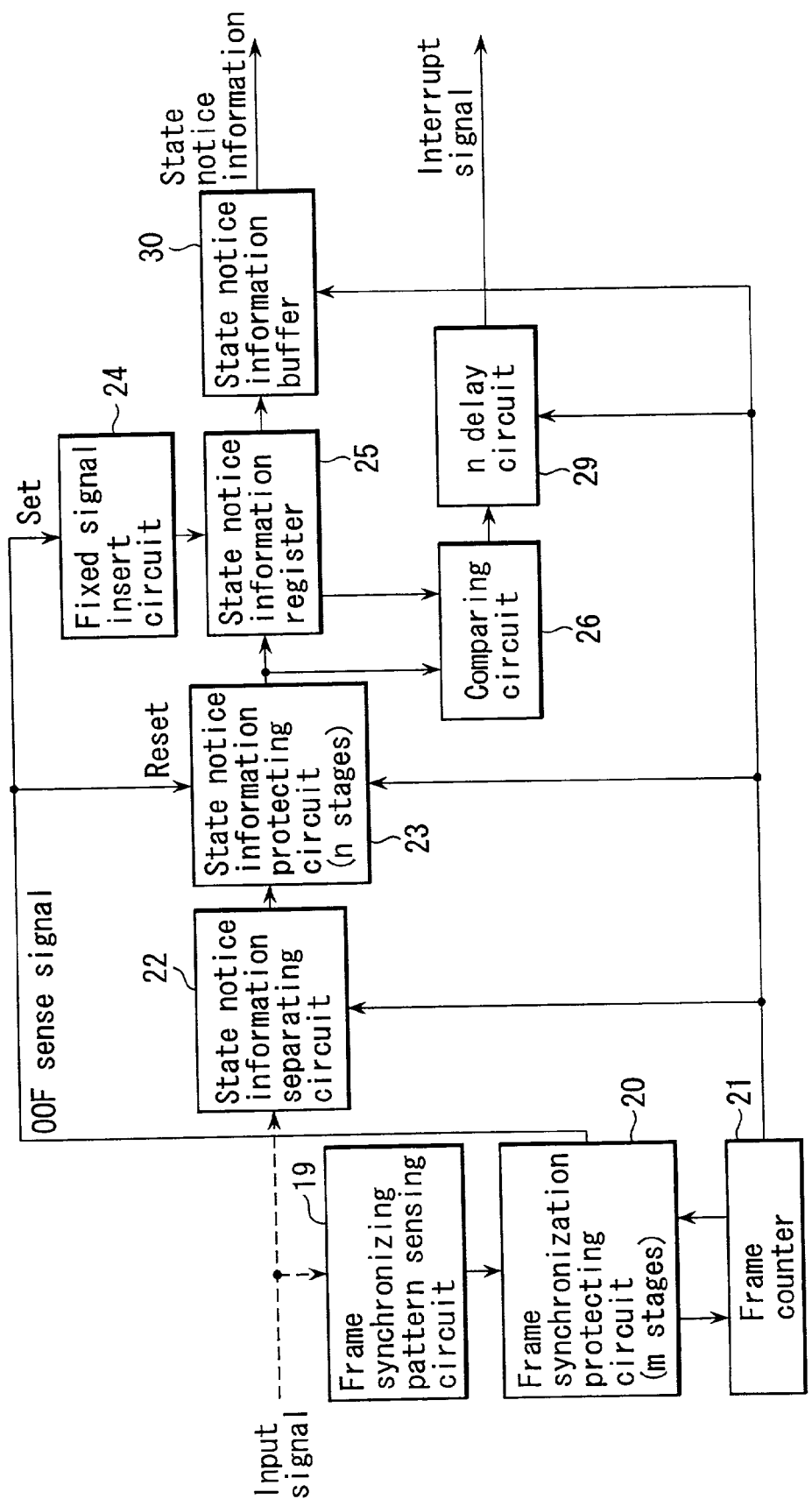
FIG. 14 is a block diagram showing the configuration of the signal processing module 17 of FIG. 9 in a third embodiment of the present invention.

Next, a third embodiment of the present invention will be explained. FIG. 14 is a block diagram of the signal processing module 17 of FIG. 9 in the third embodiment. In FIG. 14, the parts common to those in FIG. 10 are indicated by the same reference numerals and only the different parts will be explained.

In FIG. 14, the signal processing module 17 includes an n delay circuit 29 which delays the interrupt signal generated at the comparing circuit 26 for three frames and a state notice information buffer 30 which delays the held contents output from the state notice information register 25 for one frame.

Figure 15:
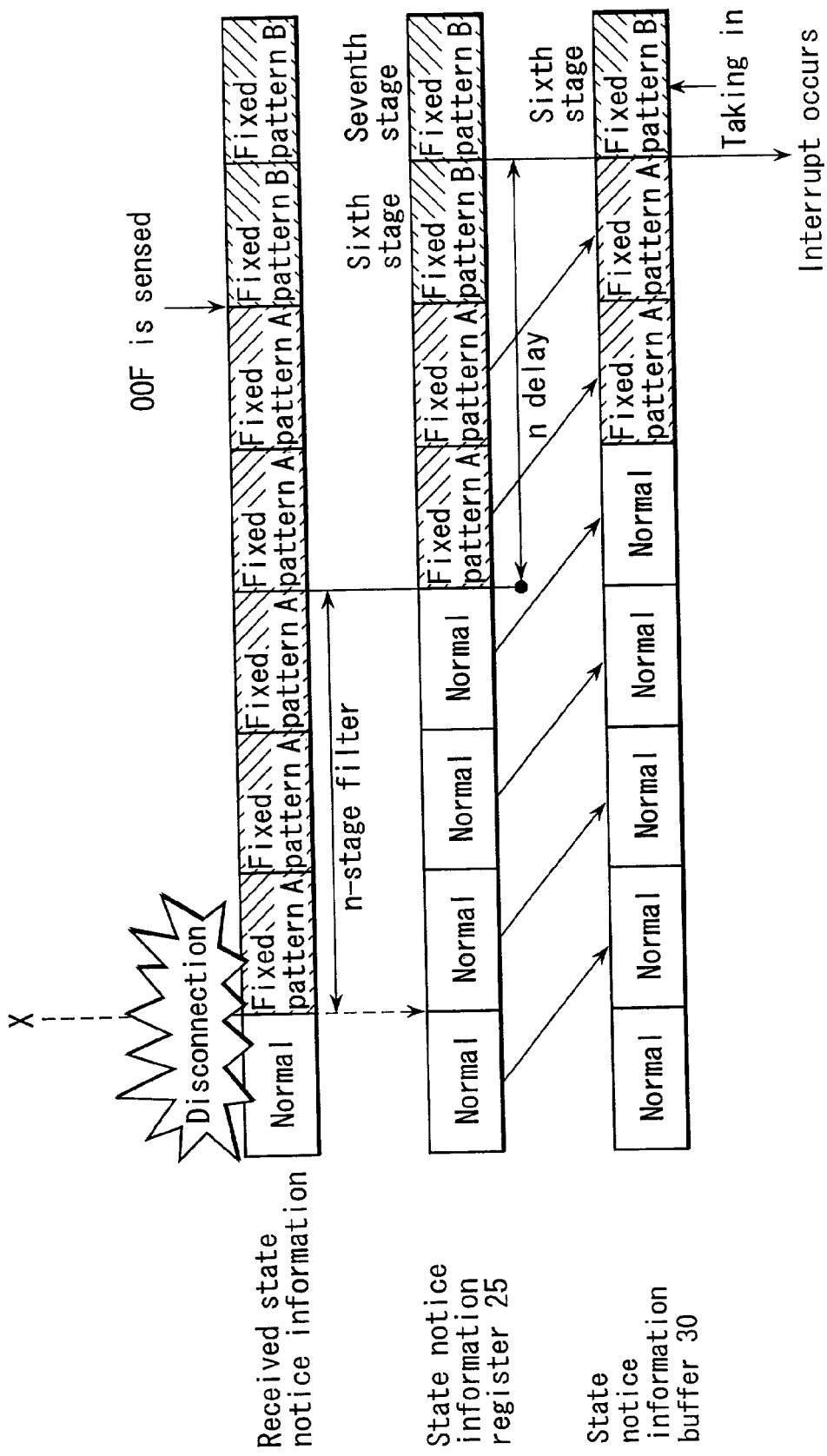
FIG. 15 is a time chart to help explain the operation in the configuration shown in FIG. 14.

The operation in the above configuration will be explained by reference to FIG. 15. In FIG. 15, after three stages of protection from time X, the register value of the state notice information register 25 changes. Normally, an interrupt signal would be generated at this time. In the third embodiment, however, the n delay circuit 29 delays the interrupt signal for three frames. Thus, the register value of the state notice information register 25 in the seventh stage from time X is read.

As it stands now, however, there is a possibility that the register value in the sixth stage of the state notice information register 25 will be omitted. In the third embodiment, to overcome this problem, a state notice information buffer 30 is provided. The state notice information buffer 30 delays the held output from the state notice information register 25 for one frame, thereby eliminating the omission of data.

The above configuration also enables the protected state notice information within one frame from the occurrence of OOF to be read. Consequently, the third embodiment also produces the same effect as those of the first and second embodiments.

FOURTH EMBODIMENT

Figure 16:
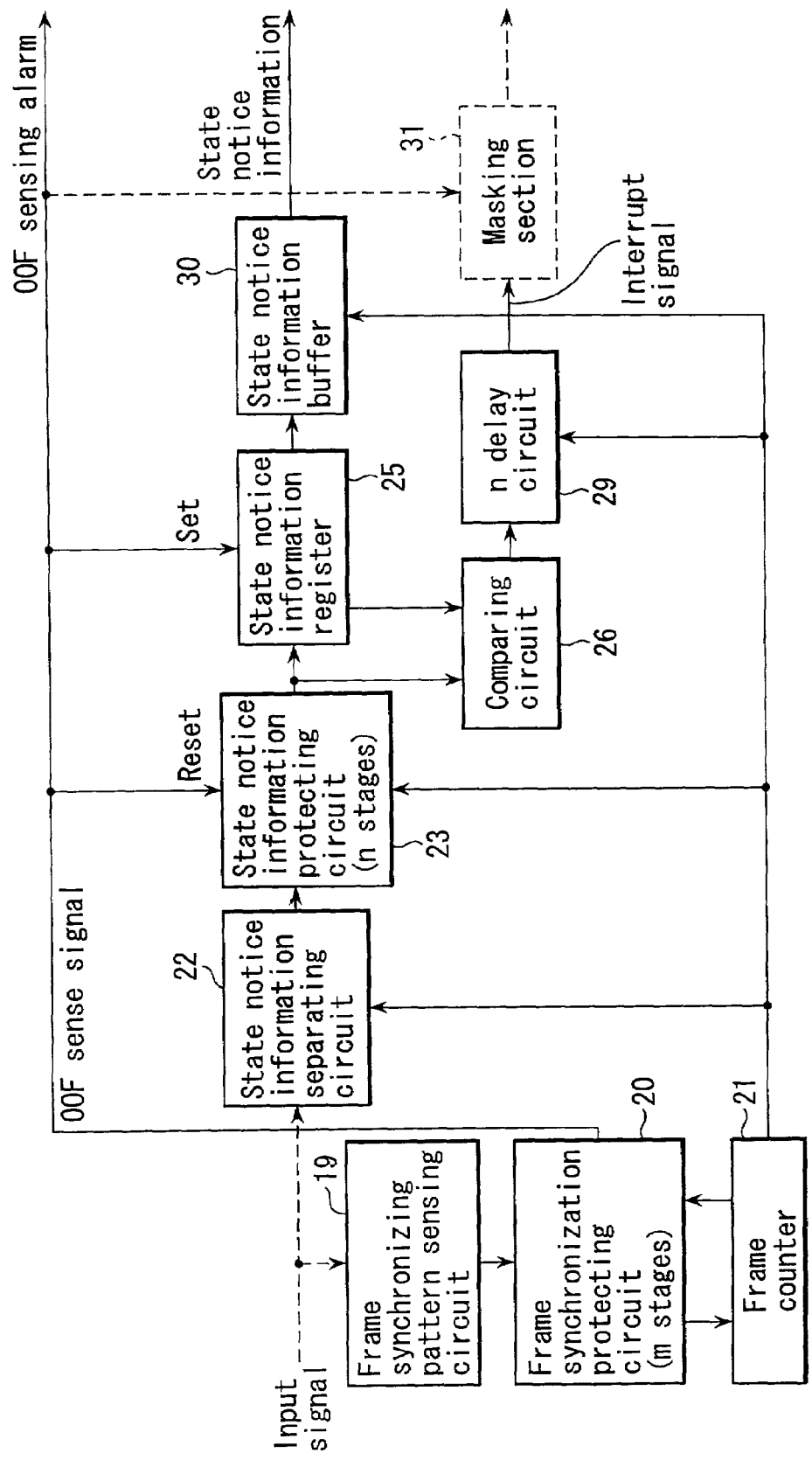
FIG. 16 is a block diagram showing the configuration of the signal processing module 17 of FIG. 9 in a fourth embodiment of the present invention.

Next, a fourth embodiment of the present invention will be explained. FIG. 16 is a block diagram of the signal processing module 17 of FIG. 9 in the fourth embodiment. In FIG. 16, the parts common to those in FIG. 14 are indicated by the same reference numerals and only the different parts will be explained.

In FIG. 16, the signal processing module 17 includes masking section 31. The masking section 31, which is realized in the form of, for example, a software control function, masks the interrupt signal about to be sent to the subcontroller 18, when an OOF sense alarm has been given. In other words, the masking section 31 supplies the interrupt signal to the subcontroller 18 only when Out of Frame has not been sensed.

The masking section 31 may be provided in the form of a processing function in the signal processing module 17. Alternatively, it may be provided in the form of a processing function in the subcontroller 18.

Figure 17:
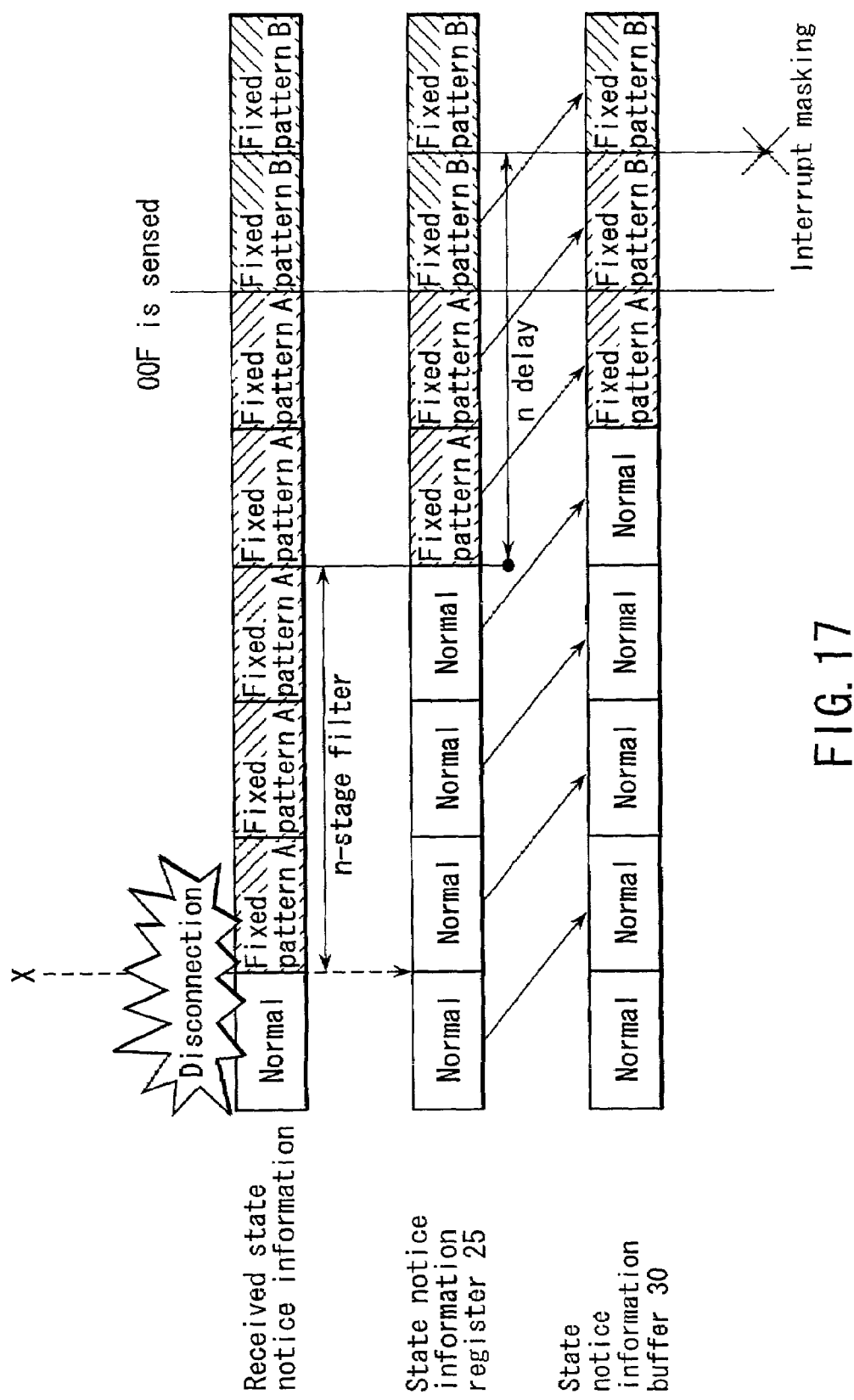
FIG. 17 is a time chart to help explain the operation in the configuration shown in FIG. 16.

The operation in the above configuration will be explained by reference to FIG. 17. In FIG. 17, the interrupt signal delayed for three stages is masked at the masking section 31. This prevents the state notice information from being taken in. As a result, the switching function control section 15a does not carry out the process after the signal has been disconnected and continues the process according to the state notice information before the occurrence of the failure.

That is, in the fourth embodiment, the interrupt signal after the occurrence of OOF is ignored and the state notice information is prevented from being taken in. This prevents the switching function control means 15 from carrying out the process, thereby preventing an erroneous operation from being carried out.

In the first to third embodiments, meaningless contents are written in the taken-in state notice information, thereby indirectly preventing the autonomous protection switching function from operating erroneously. In the fourth embodiment, however, the state notice information is prevented from being taken in, thereby more directly preventing the autonomous protection switching function from operating erroneously. Consequently, the fourth embodiment also makes it possible to eliminate the possibility of a faulty operation attributable to the erroneous recognition of the state notice information. Furthermore, in the fourth embodiment, since invalid state notice information is not supplied to the switching function control section 15a, the burden of the software processing can be reduced.

As described above, the first to fourth embodiments mainly produce the following effects in item (1) and item (2):

(1) The state notice information changing continually every three bytes can be sensed without any omission.

(2) Fixed pattern (A) inserted at the time of the disconnection of a multiplex signal with five bytes of protection stages can be prevented from being recognized erroneously as being effective as state notice information.

From the items mentioned above, it is possible to provide a node unit and a state notice information acquiring method which eliminate the possibility of a faulty operation attributable to the erroneous recognition of state notice information.

Whether a node unit related to the present invention fulfills item (1) can be verified by inputting the state notice information changing every three bytes by an analyzer or the like and determining whether the protection switching function changes the switching state properly.

Whether a node unit related to the present invention fulfills item (2) can be verified by inputting 5-byte fixed pattern (B) and checking the switching state of the protection switching function.

The present invention is not limited to the above embodiments.

For instance, in each of the above embodiments, whether the state notice information after the buffering of five frames is the fixed value of OOF, or whether the state notice information is the normal value or the bit string of fixed pattern (B) due to OOF, is determined in hardware. When the capability of the processor is sufficient, these processes may be executed in software.

That is, the control program following the flowchart of FIG. 4 is stored in, for example, the storage section 14. On the basis of the program, the control section 15 is caused to operate, which produces a similar effect to that described above.

Although in the above embodiments, it has been assumed that m=5 and n=3, the values of m and n are not restricted to these. For instance, when n=3, m may be m=4 or m=3 instead of m=5. This invention may be applied to such a system.

Furthermore, in the embodiments, the explanation has been given by reference to a ring network. The idea of the present invention, however, may be applied not only to a ring network but also to various networks differing in topology, such as a linear network or a mesh network.

Moreover, in this invention, if the frame period of the transmitted multiplex signal is S and the frame protection period is T, when there arises a possibility that Out of Frame of the transmission signal will occur at time X, whether the state notice information is valid or invalid during period t, where X+T<t<X+n×S×2, may be determined on the basis of whether Out of Frame has actually occurred.

In addition, the embodiments may be applied to a system which sends the state notice information over a dedicated line without multiplexing the state notice information with a transmission signal in an embedding manner. In this case, the transmission signal transmitted via a line cable has only to synchronize frame by frame with the state notice information transmitted via the dedicated line.

In this type of system, even if the protection switching function operates as a result of the disconnection of the line cable, when the dedicated line has not been disconnected, it is naturally impossible to recognize the change point in the state notice information as the disconnection of the cable.

In such a case, the idea of the present invention can be applied more suitably by masking the state notice information by a software or hardware approach on the basis of the disconnected state of the line cable and dedicated line. Hereinafter, an embodiment where this invention is applied to a system which sends state notice information over a dedicated line will be explained.

FIFTH EMBODIMENT

Figure 18:
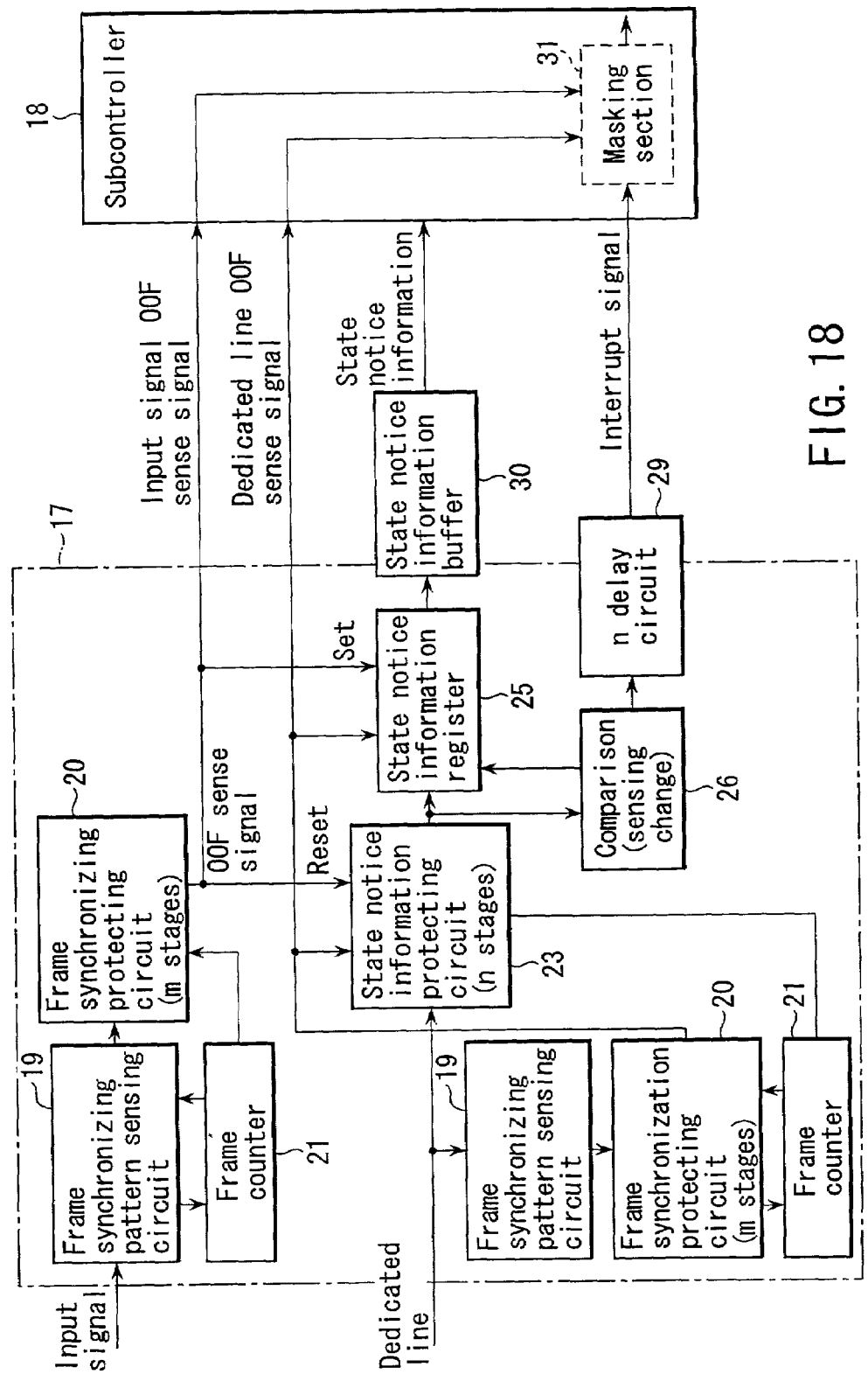
FIG. 18 is a block diagram showing the configuration of the signal processing module 17 of FIG. 9 in a fifth embodiment of the present invention.

Next, a fifth embodiment of the present invention will be explained. FIG. 18 is a block diagram of the signal processing module 17 of FIG. 9 in the fifth embodiment. In FIG. 18, the parts common to those in FIG. 16 are indicated by the same reference numerals and only the different parts will be explained.

In FIG. 18, the input signal is a transmission signal on a main signal line. A dedicated line carries a state notice information signal. These signals are designed to be transmitted over separate lines. A frame synchronizing pattern sensing circuit 19, a frame synchronization protecting circuit 20, and a frame counter 21 are provided for each of the input signal and the dedicated line. They sense the end of each frame and apply m-stage protection. Each of the input signal OOF sense signal and dedicated line OOF sense signal sensed here is notified to the subcontroller 18.

By carrying out a mask process using the input signal OOF sense signal and dedicated line OOF sense signal, the fifth embodiment produces a similar effect to that of the fourth embodiment.

This invention may be practiced or embodied in still other ways without departing from the spirit or essential character thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A node unit provided in a digital signal transmission system which includes a plurality of node units for transmitting a digital transmission signal in frame form, each frame of said digital transmission signal including at least a frame header indicating the end of the signal frame, and said plurality of node units exchanging state notice information about autonomous operation with one another, said node unit comprising:

state notice information protecting means for taking in said state notice information when said state notice information coincides with predetermined n, where n is a natural number, stages of frames consecutively;

frame synchronization protecting means for protecting the frame synchronization of said digital transmission signal until errors are sensed consecutively over predetermined m, where m is a natural number, stages of frames in said frame header; and information taking-in means for, if the expression m>2n holds when the frame synchronization protecting means has sensed errors consecutively over m stages of frames in said frame header, regarding said state notice information included in a k-th stage, provided that k meets the expression $m<k\leq(Int(m/n)+1)\times n$, where Int (m/n) is an integer obtained by discarding decimals of m/n, frame as valid information using the frame including the frame header where an error first occurred as a reference and taking in the valid information.

2. A node unit according to claim 1, wherein said information taking-in means defers the process of taking in said state notice information until said k-th stage frame is reached and regards said state notice information as valid unless said frame synchronization protecting means does not sense Out of Frame in the range from the n-th stage frame to the k-th stage frame.

3. A state notice information acquiring method which determines whether state notice information is valid or invalid in a digital signal transmission system which includes a plurality of node units for transmitting a digital transmission signal in frame form, each frame of said digital transmission signal including at least a frame header indicating the end of the signal frame, and said plurality of node units exchanging state notice information about autonomous operation with one another, said state notice information acquiring method comprising:

a first step of taking in said state notice information when said state notice information coincides with predetermined n, where n is a natural number, stages of frames consecutively;

a second step of protecting the frame synchronization of said digital transmission signal until errors are sensed consecutively over predetermined m, where m is a natural number, stages of frames in said frame header; and a third step of, if the expression m>2n holds when errors are sensed consecutively over m stages of frames in said frame header in the second step, regarding said state notice information included in a k-th stage, provided that k meets the expression $m<k\leq(Int(m/n)+1)\times n$, where Int(m/n) is an integer obtained by discarding decimals of m/n, frame as valid information using the frame including the frame header where an error first occurred as a reference and taking in the valid information.

4. A state notice information acquiring method according to claim 3, wherein said third step defers the process of taking in said state notice information until said k-th stage frame is reached and regards said state notice information as valid unless Out of Frame is not sensed in the range from the n-th stage frame to the k-th stage frame in the second step.

* * * * *

UNITED STATES PATENT AND TRADEMARK OFFICE
CERTIFICATE OF CORRECTION

PATENT NO. : 7,103,042 B2
APPLICATION NO. : 10/101772
DATED : September 5, 2006
INVENTOR(S) : Matsuno et al.

It is certified that error appears in the above-identified patent and that said Letters Patent is hereby corrected as shown below:

\* Title page, item (75), in the Inventors, change "Kobayashi," to --Kobashi,--.

Title page, item (57), in the Abstract, change "expressing" to --expression--.

Signed and Sealed this

Twelfth Day of December, 2006

JON W. DUDAS
*Director of the United States Patent and Trademark Office*